(12) United States Patent
Choi

(10) Patent No.: US 6,639,606 B1
(45) Date of Patent: Oct. 28, 2003

(54) DISPLAY SCREEN SPLIT METHOD FOR A COMPUTER SYSTEM

(75) Inventor: Seung-Bum Choi, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/035,207

(22) Filed: Mar. 5, 1998

(30) Foreign Application Priority Data

Mar. 6, 1997 (KR) .............................................. 97-7475
Apr. 18, 1997 (KR) ............................................ 97-14557

(51) Int. Cl.$^7$ ................................................ G09G 5/00
(52) U.S. Cl. ....................... 345/700; 345/764; 345/765; 345/767
(58) Field of Search ................................ 345/141, 340, 345/342, 348, 700, 764–767, 676

(56) References Cited

U.S. PATENT DOCUMENTS

| | | | |
|---|---|---|---|
| 4,204,208 A | * 5/1980 | McCarthy | 345/141 |
| 4,399,462 A | 8/1983 | Balopole et al. | |
| 4,611,202 A | 9/1986 | Kinitto et al. | |
| 4,649,377 A | 3/1987 | Urabe | |
| 4,766,427 A | 8/1988 | Abe et al. | |
| 4,872,001 A | 10/1989 | Netter | |
| 4,879,697 A | 11/1989 | Lowrance et al. | |
| 4,931,872 A | 6/1990 | Stoddard et al. | |
| 4,987,412 A | * 1/1991 | Vaitekunas et al. | 345/635 |
| 5,060,170 A | * 10/1991 | Bourgeois et al. | 345/788 |
| 5,136,435 A | 8/1992 | Miyahara | |
| 5,185,666 A | 2/1993 | Capitant et al. | |
| 5,266,933 A | 11/1993 | Frank et al. | |
| 5,390,295 A | * 2/1995 | Bates et al. | 345/789 |
| 5,411,270 A | 5/1995 | Naka et al. | |
| 5,470,080 A | 11/1995 | Naka et al. | |
| 5,577,187 A | 11/1996 | Mariani | |
| 5,714,971 A | * 2/1998 | Shalit et al. | 345/804 |
| 5,877,760 A | * 3/1999 | Onda et al. | 345/784 |
| 5,905,476 A | * 5/1999 | McLaughlin et al. | 345/781 |
| 5,916,163 A | * 6/1999 | Panescu et al. | 600/424 |

FOREIGN PATENT DOCUMENTS

| | | |
|---|---|---|
| EP | 0 156 116 A2 | 10/1985 |
| EP | 0 422 577 A2 | 4/1991 |
| JP | 64061785 * 8/1989 | G09G/1/00 |

OTHER PUBLICATIONS

Windows NT version 4.0, Library of Congress, www.loc.gov., Dec. 6, 1996.*
IBM Technical Disclosure Bulletin, vol. 37, No. 01, Jan. 1994 entitled *Mouse–Driven Session Control/Session Scrolling on Non–Programmable Terminals.*
*XEmacs User's Manual,* Jul. 1994, Richard Stallman, Lucid, Inc. and Ben Wing.
Office Communication from European Patent Office dated Aug. 20, 2002.

* cited by examiner

Primary Examiner—Steven Saras
Assistant Examiner—Alecia D Nelson
(74) Attorney, Agent, or Firm—Robert E. Bushnell, Esq.

(57) ABSTRACT

A display screen split method for a computer system by which a user can vertically and exactly set two programs on a monitor to the same screen size in a graphic device supporting a wide monitor and a wide function. The display screen split method for a computer system comprises the steps of determining whether a command for setting a split screen exists, and setting the size of the screen to the left half size or the right half size of the entire screen if the command for setting the split screen exists.

14 Claims, 12 Drawing Sheets

DISPLAY SCREEN SPLIT METHOD FOR A COMPUTER SYSTEM

CLAIM OF PRIORITY

This application makes reference to, incorporates the same herein, and claims all benefits accruing under 35 U.S.C. §119 from an application for DISPLAY SCREEN SPLIT METHOD OF A COMPUTER SYSTEM earlier filed in the Korean Industrial Property Office on the of Mar. 6, 1997 and there duly assigned Ser. No. 7475/1997 and an application for DISPLAY SCREEN SPLIT METHOD OF A COMPUTER SYSTEM earlier filed in the Korean Industrial Property Office on the of Apr. 18, 1997 and there duly assigned Ser. No. 14557/1997

BACKGROUND OF THE INVENTION

1. Technical Field

The present invention relates to a display screen split method for a computer system. More particularly, the present invention relates to a display screen split method for a computer system by means of which a user can vertically and exactly set two programs on a monitor to the same screen size in a graphic device supporting a wide monitor and a wide function.

2. Related Art

In general, personal computers have a display unit or monitor having a width-to-height ratio of 4 to 3. However, a wider screen having a width-to height ratio of 16 to 9 is frequently used, for example, for graphic or computer aided design (CAD) applications, or for other reasons. Furthermore, in general, application programs employ a conventional window having three function buttons—for example, an icon display button, an entire/previous screen button, and an end button. Typically, such function buttons are displayed in an upper left portion of a screen in order to control the size of the screen.

Thus, a user can control the size of the screen by clicking a mouse at the four comers of a program window, such comers constituting a position for controlling the size of the program. Moreover, if the user wants to set a predetermined program to a left-half size of the entire screen or a right-half size of the entire screen using a particular function, such as a two-screen view of a wide television screen, a conventional screen control button is used in a monitor having a wide screen function or a graphic device.

The latter techniques are burdened by a disadvantage in that the user cannot exactly set the size of the screen to the left-half size of the entire screen or the right-half size of the entire screen since the user controls the size of the screen manually. Thus, there is a need in the prior art for the development of a method whereby the user can exactly set the size of the screen to a left-half size or right-half size of an entire screen.

It is recognized that certain word processing programs have a capability of splitting a display Is screen for simultaneously editing two documents. However, as explained in more detail below, this is to be distinguished from the capability of splitting a display screen in order to control a plurality of programs (such as Window programs) at the system level. Thus, there is a need in the prior art for the development of a method whereby the user can split the display screen so as to achieve control of more than one program at the system level.

The following patents are considered to be representative of the prior art relative to the present invention, and are burdened by the disadvantage discussed above: U.S. Pat. No. 5,470,080 to Naka et al., entitled Multi-Player Video Game Apparatus With Single Screen Mode And Split Screen Mode, U.S. Pat. No. 5,411,270 to Naka et al., entitled Split-Screen Video Game With Character Playfield Position Exchange, U.S. Pat. No. 5,266,933 to Frank et al., entitled Method And apparatus For Displaying A Screen Separator Line, U.S. Pat. No. 5,185,666 to Capitant et al., entitled Digitized Film Image Processing System With Bordered Split Screen Display, U.S. Pat. No. 5,136,435 to Miyahara, entitled Screen-Splitting System For A Video Recording And Reproducing Apparatus, U.S. Pat. No. 4,931,872 to Stoddard et al., entitled Methods of And Apparatus For The Generation Of Split-Screen Video Displays, U.S. Pat. No. 4,879,697 to Lowrance et al., entitled Sonar Fish Finder Apparatus Providing Split-Screen Display, U.S. Pat. No. 4,872,001 to Netter, entitled Split Screen Imaging, U.S. Pat. No. 4,766,427 to Abe et al., entitled Display Apparatus With Display Screen Splitting Function, U.S. Pat. No. 4,649,377 to lie Urabe, entitled Split Image Display Control Unit, U.S. Pat. No. 4,611,202 to DiNitto et al., entitled Split Screen Smooth Scrolling Arrangement, and U.S. Pat. No. 4,399,462 to Balopole et al., entitled Video Split Screen Technique.

SUMMARY OF THE INVENTION

Accordingly, the object of the present invention is to provide a display screen split method for a computer system by which a user can vertically and exactly set two programs on a monitor to the same screen size in a graphic device supporting a wide monitor and a wide function so as to substantially obviate one or more of the problems due to limitations and disadvantages of the related art.

To achieve the objects, and in accordance with the purpose of the invention as embodied and broadly described herein, a display screen split method for a computer system is carried out in the following manner. A command for setting a split screen is entered, and the size of the screen is set to the left half size or the right half size of the entire screen.

As mentioned earlier, the method of splitting a display screen in accordance with the present invention is to be distinguished from a method of splitting a display screen in a particular program, such as a word processing program (e.g., Microsoft Word). Programs in the latter category split a display screen for simultaneously editing two documents within a single program, such as a word processing program. In contrast, the present invention enables a user to control all open Windows programs, and not just a particular program. That is to say, the advantage of the present invention is achievement of control of a plurality of programs at the system level.

For example, in accordance with the present invention, a user can display two programs on a monitor, can use the left half of the screen for a word processor program, and can then use the right half of the screen to watch a movie. In contrast, a particular program must be modified to support a display screen split function for that program. It is considered to be impractical to modify all programs to enable them to support such a function. Thus, the present invention has an advantage in that it may be used to enable such a function in all programs without modifying those programs.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, illustrate an embodiment of the invention and, together with the description, serve to explain the principles of the invention.

In the drawings.

DESCRIPTION OF THE PREFERRED EMBODIMENT

Reference will now be made in detail to preferred embodiments of the present invention, examples of which are illustrated in the accompanying drawings.

Figure 11:
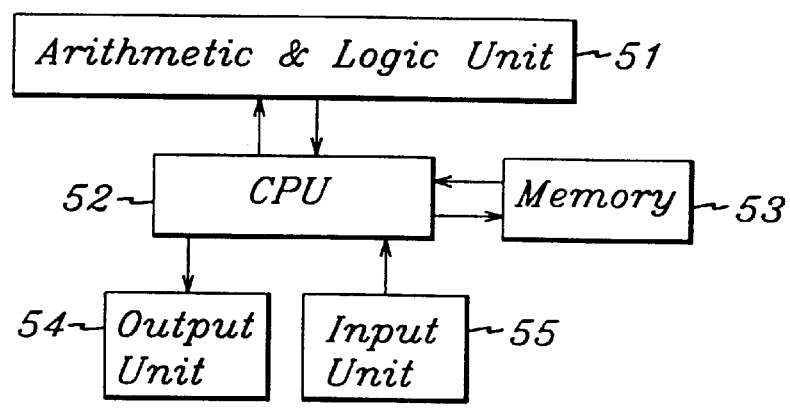
FIG. 11 is a block diagram of a computer.

Generally, a personal computer has a construction as illustrated in FIG. 11. A central processing unit (CPU) 52 generalizes all the control commands. That is, the CPU 52 controls an arithmetic and logic unit (ALU) 51 to perform a logic or an arithmetic calculation. The CPU 52 controls an input unit 85, such as a keyboard or a mouse, to receive data, and an output unit 54 to output the data. The CPU 52 stores the data in a memory 53 or the data is outputted from the memory 53.

Figure 12:
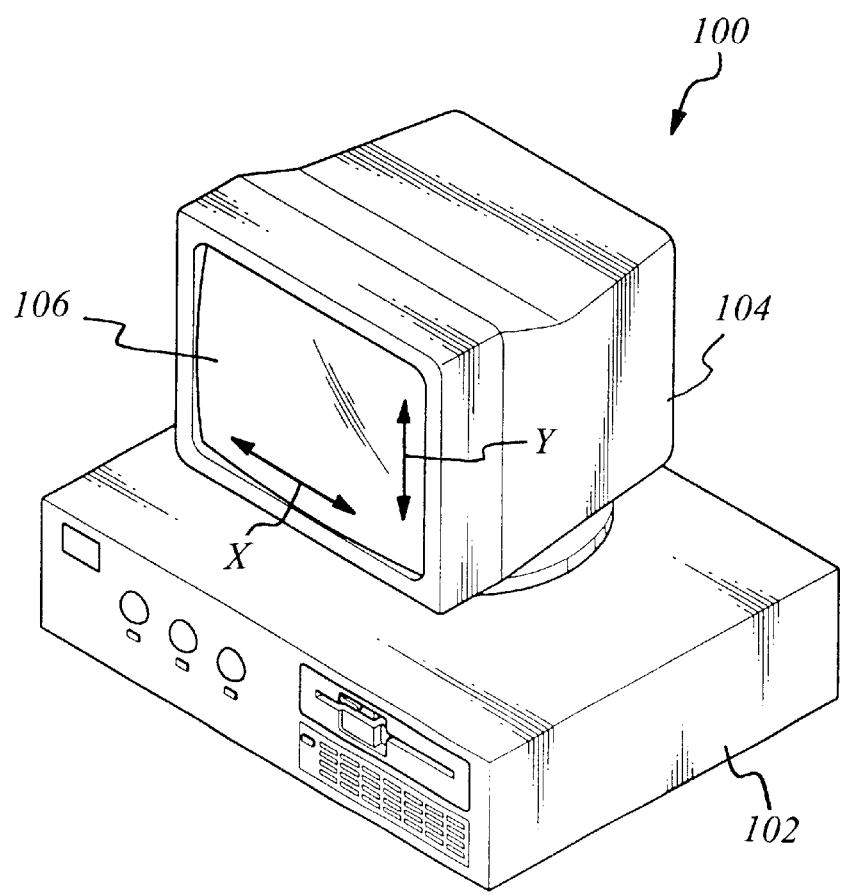
FIG. 12 is a view of a computer having a monitor with a ratio of 4 to 3.
Figure 13:
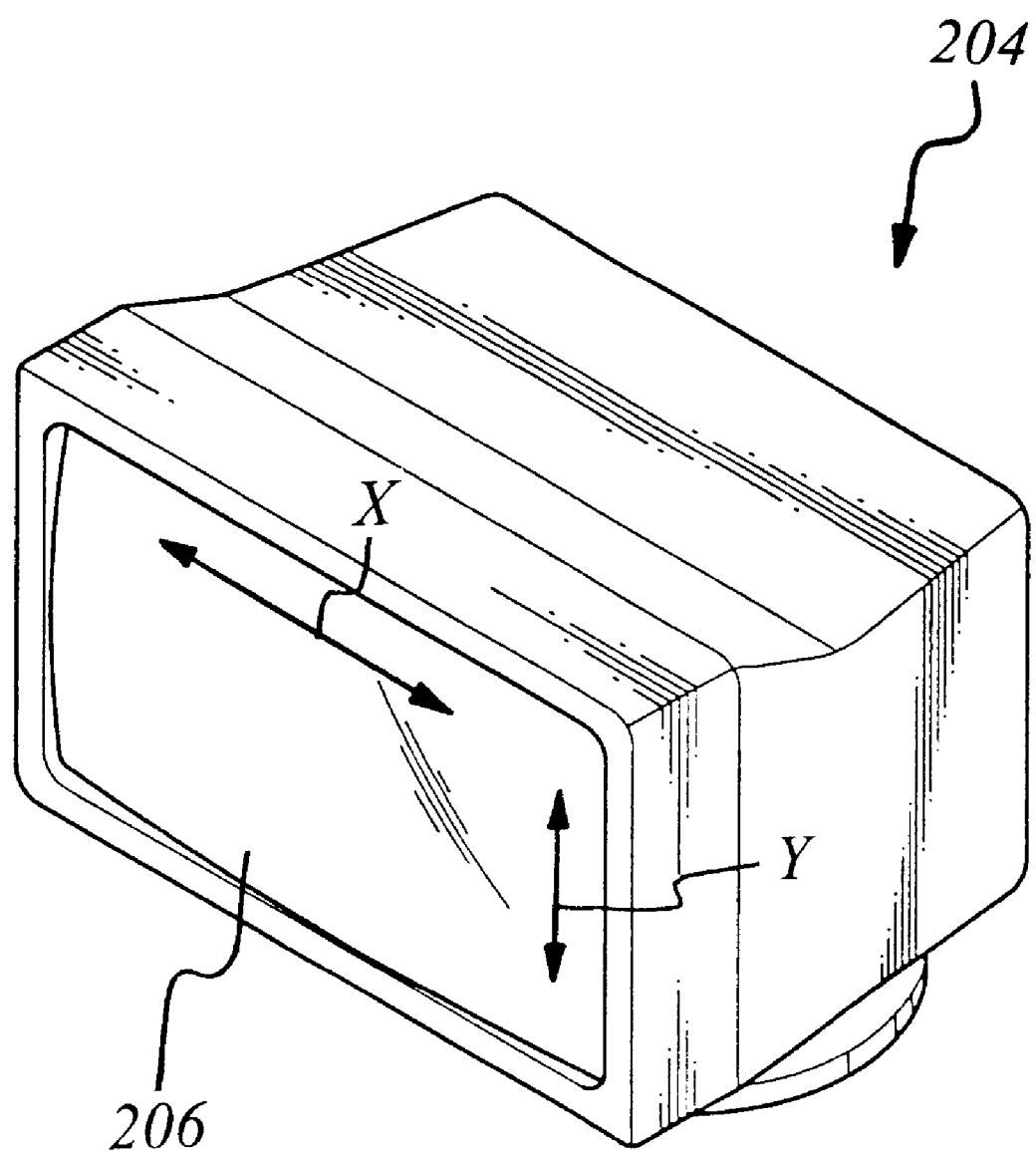
FIG. 13 is a perspective view of a monitor having a screen with a ratio of 16 to 9.

In addition, a general personal computer has a configuration as shown in FIG. 12. The computer 100 comprises a processor 102 and a monitor 104 having a screen 106 having orthogonal dimensions X and Y as shown in FIG. 12. The computer 100 of FIG. 12 has a monitor 104 with a screen ratio of 4 to 3. However, the use of a monitor 204 having a wide screen 206 with a ratio of 16 to 9, as illustrated in FIG. 13, is frequent due to graphic or CAD or other reasons.

Generally, an application program on the basis of a conventional window has three function buttons, such as an icon display button, an entire/previous screen button and an end button, in an upper left portion of a screen to control the size.

A user can control the size by clicking a mouse at four corners of a program window, which are positions for controlling the size of the program, if the user wants to set a predetermined program to a left half size of the entire screen or a right half size of the entire screen. In such a case, the user employs a function such as a two-screen view of a wide television when a conventional screen size control button is used in the monitor having a wide screen function or a graphic device.

However, the above-mentioned method has a disadvantage in that the user cannot exactly set the size of the screen to the left half size of the entire screen or the right half size of the entire screen since the user controls the size of the screen manually.

The explanation for reference numerals in FIGS. 3 thru 6 and 8 thru 10 of the drawings is as follows: Numeral 1 indicates a left split icon, 2 indicates a right split icon, 3 indicates a minimize icon, 4 indicates a restore icon, 5 indicates an end icon, 6 indicates a maximize icon, 7 indicates a left/right split screen setting icon, 11 indicates a window name, 12 indicates a menu bar, 13 indicates an icon bar, 14 indicates a job window, 15 indicates an icon bar, 17 indicates a vertical scroll bar, 18 indicates a horizontal scroll bar, 19 indicates a job indicating line, and 20 indicates a tray region.

Figure 1:
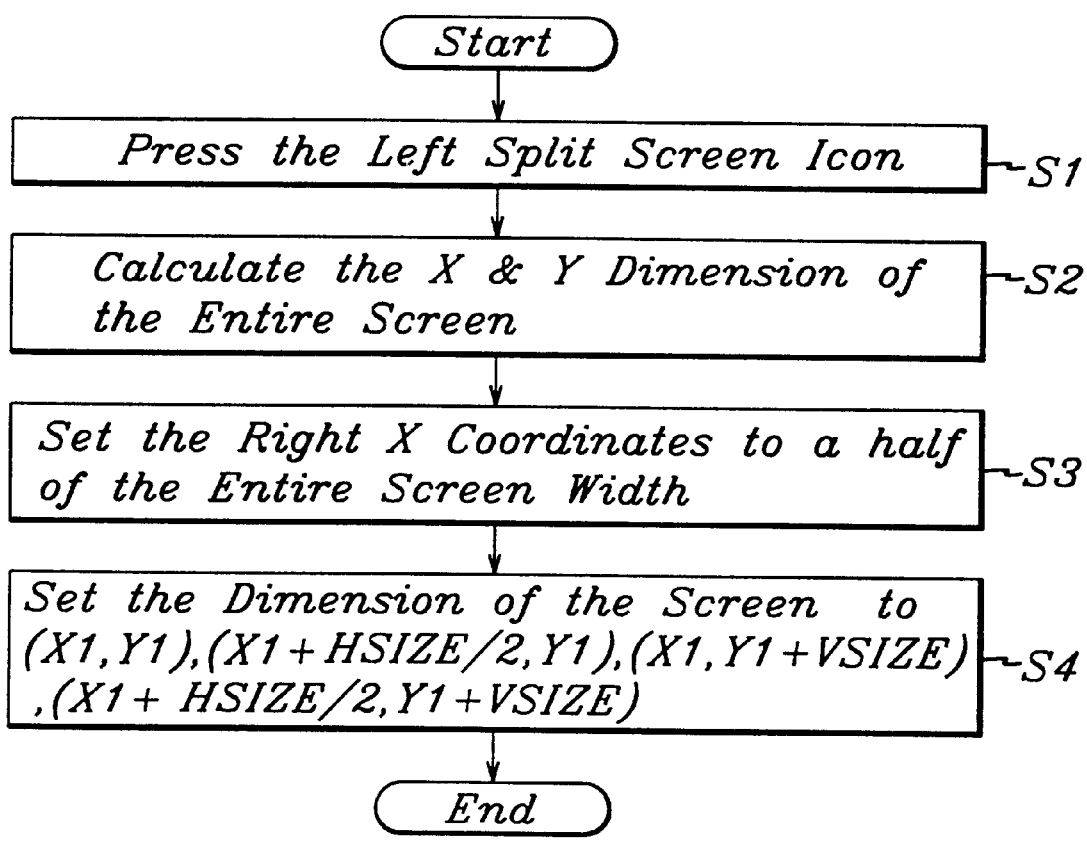
FIG. 1 is a flowchart of a display screen split method for a computer system according to a first preferred embodiment of the present invention.

Referring to FIG. 1, a left split method of a computer system display screen according to a first preferred embodiment of the present invention comprises the steps of: sensing whether a left split icon 1 is pressed (Step 1); calculating a horizontal dimension X and a vertical dimension Y of an entire screen if the left split icon 1 is pressed (Step 2); setting right X coordinates of the screen to a half of the width of the entire screen after calculating the horizontal dimension X and vertical dimension Y of the entire screen (Step 3); and setting the dimension of the screen to (X1, Y1), (X1+HSIZE/2, Y1), (X1, Y1+VSIZE), and (X1+HSIZE/2, Y1+VSIZE)(Step 4).

Figure 2:
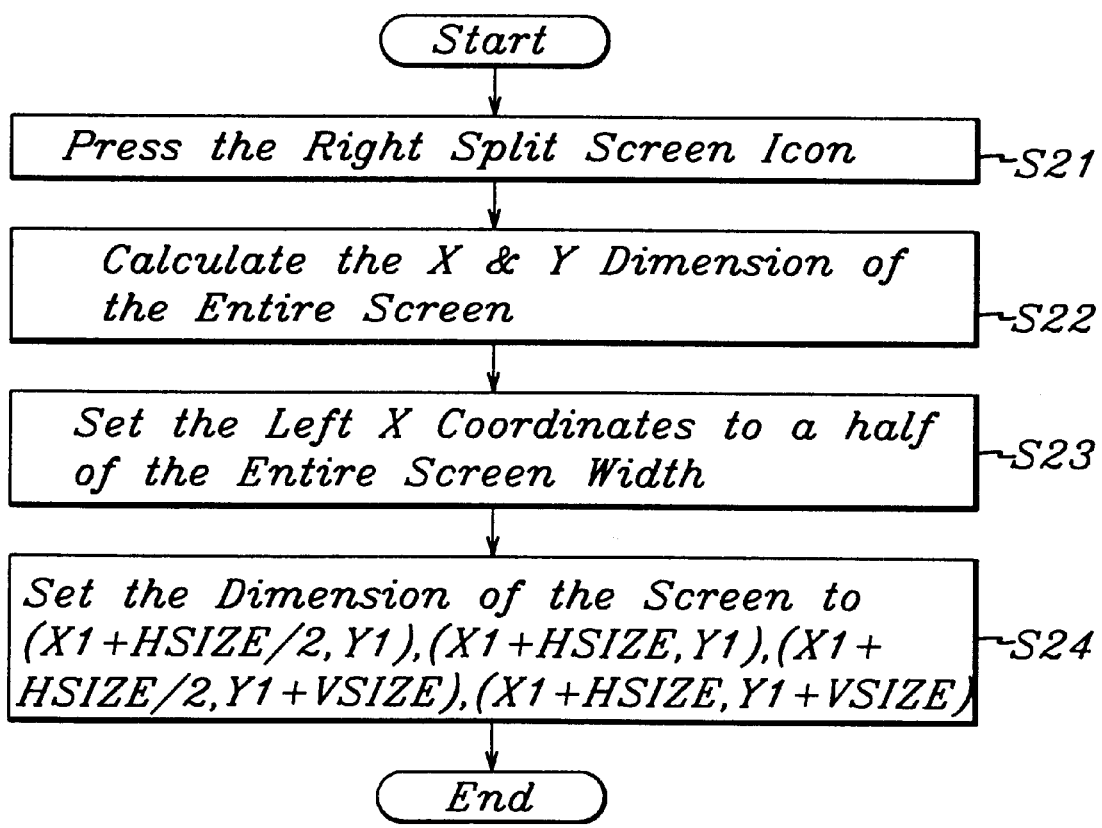
FIG. 2 is a flowchart of a display screen split method for a computer system according to the first preferred embodiment of the present invention.

Referring to FIG. 2, a right split method of a computer system display screen according to the first preferred embodiment of the present invention comprises the steps of: sensing whether a right split icon 2 is pressed (Step 21); calculating a horizontal dimension X and a vertical dimension Y of an entire screen if the right split icon 2 is pressed (Step 22); setting left X coordinates of the screen to a half of the width of the entire screen after calculating the horizontal dimension X and the vertical dimension Y of the entire screen (Step 23); and setting the dimension of the screen to (X1+HSIZE/2,Y1), (X1+HSIZE, Y1), (X1+HSIZE/2, Y1+VSIZE), (X1+HSIZE, Y1+VSIZE)(Step 24).

Figure 3:
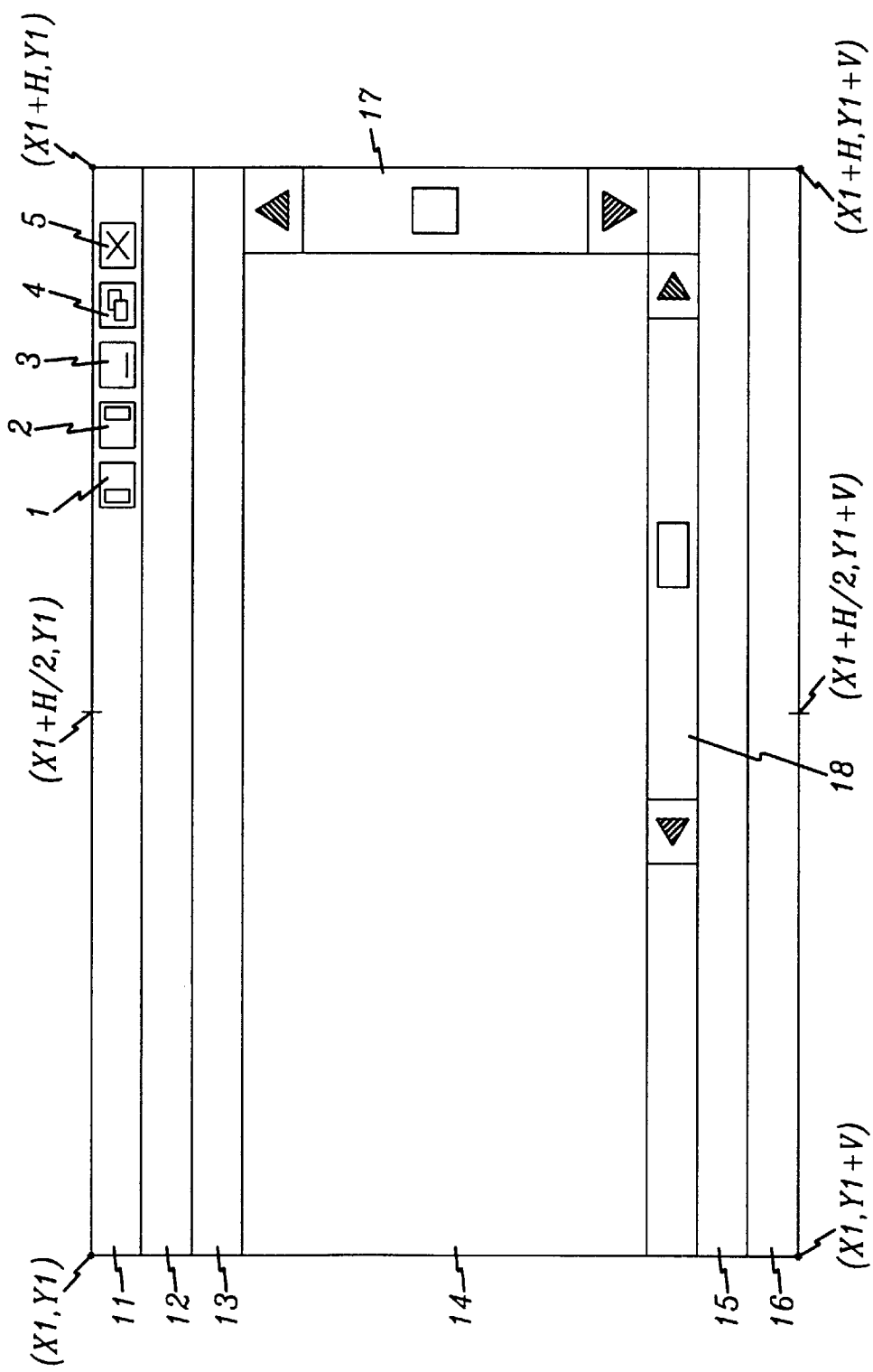
FIG. 3 is a view illustrating an entire screen state of a display screen split method for a computer system according to the first preferred embodiment of the present invention.

Referring to FIG. 3, the operation of the display screen split method of a computer system according to the preferred embodiment of the present invention is as follows.

When a user presses the left split icon 1 or the right split icon 2 which is added to an upper portion window name caption bar of a program for window, the left or the right split screen size corresponding to the half of the entire screen size is set only by a single operation.

The dimension of an X axis can be represented by the size from X1 to X1+horizontal screen, and the dimension of a Y axis can be represented by the size from Y1 to Y1+vertical screen, presuming that peaks of the left upper portion of the screen are X1 and Y1 in the screen size of an application program.

Presuming that the size of the horizontal screen is HSIZE and the size of the vertical screen is VSIZE, an upper left portion of the screen becomes (X1, Y1), an upper right portion of the screen becomes (X1+HSIZE, Y1), a lower left portion of the screen becomes (X1, Y1+VSIZE) and a lower right portion of the screen becomes (X1+HSIZE, Y1+VSIZE).

First, the program according to the display screen split method of a computer system according to the preferred embodiment of the present invention is installed in a computer.

Figure 4:
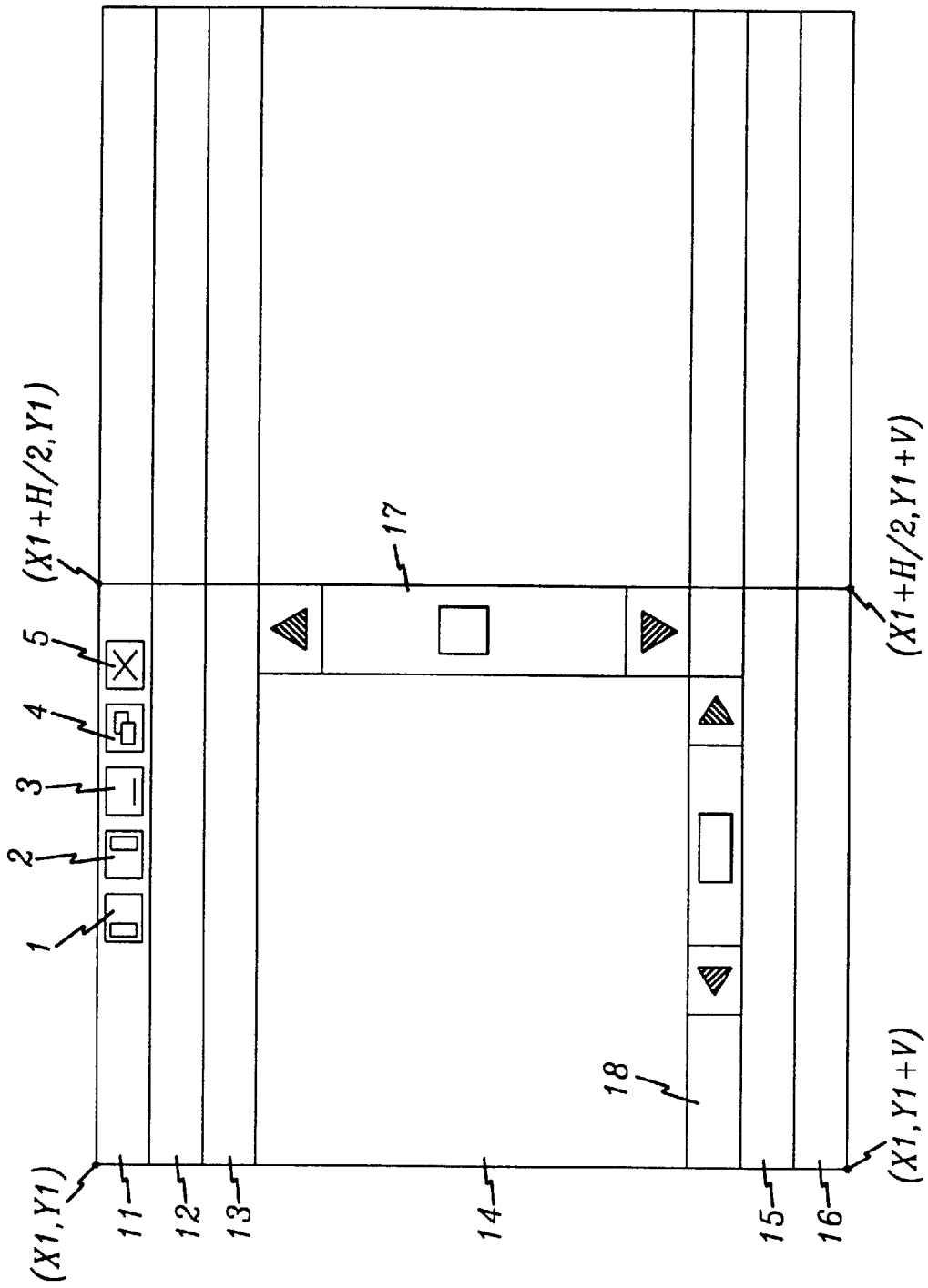
FIG. 4 is a view of a left screen split according to a display screen split method of a computer system according to the first preferred embodiment of the present invention.

Then, if the user turns ON the computer and enters a window program, an initial screen as illustrated in FIG. 4, appears.

When the user wants to split the left screen of the monitor exactly while the user performs several tasks, the user clicks the left split icon 1 in the window name 11, as illustrated in FIG. 4, using the mouse.

Then, a central processing unit (CPU) of the computer senses whether the left split screen icon 1 is pressed (Step 1).

Next, the CPU calculates the horizontal dimension (X) and the vertical dimension (Y) of the entire screen (Step 2), and sets the right X coordinates of the screen to half of the width of the entire screen (Step 3).

The CPU sets the size of the screen to (X1, Y1), (X1+HSIZE/2, Y1), (X1, Y1+VSIZE), and (X1+HSIZE/2, Y1+VSIZE) (Step 4), then the left split screen appears as illustrated in FIG. 4.

On the other hand, when the user presses the right split icon 2 (Step 21), the CPU senses whether the right split icon 2 in the window name 11 is pressed, and the CPU calculates the horizontal (X) and the vertical (Y) dimension of the entire screen(Step 22).

After calculating the horizontal dimension (X) and the vertical dimension (Y) of the entire screen, the CPU sets the left X coordinates of the screen to half of the width of the entire screen (Step 23), and sets the size of the screen to (X1+HSIZE/2, Y1), (X1+HSIZE, Y1), (X1+HSIZE/2, Y1+VSIZE), (X1+HSIZE, Y1+VSIZE) (Step 24). Then, the right split screen as illustrated in FIG. 5 appears.

Figure 5:
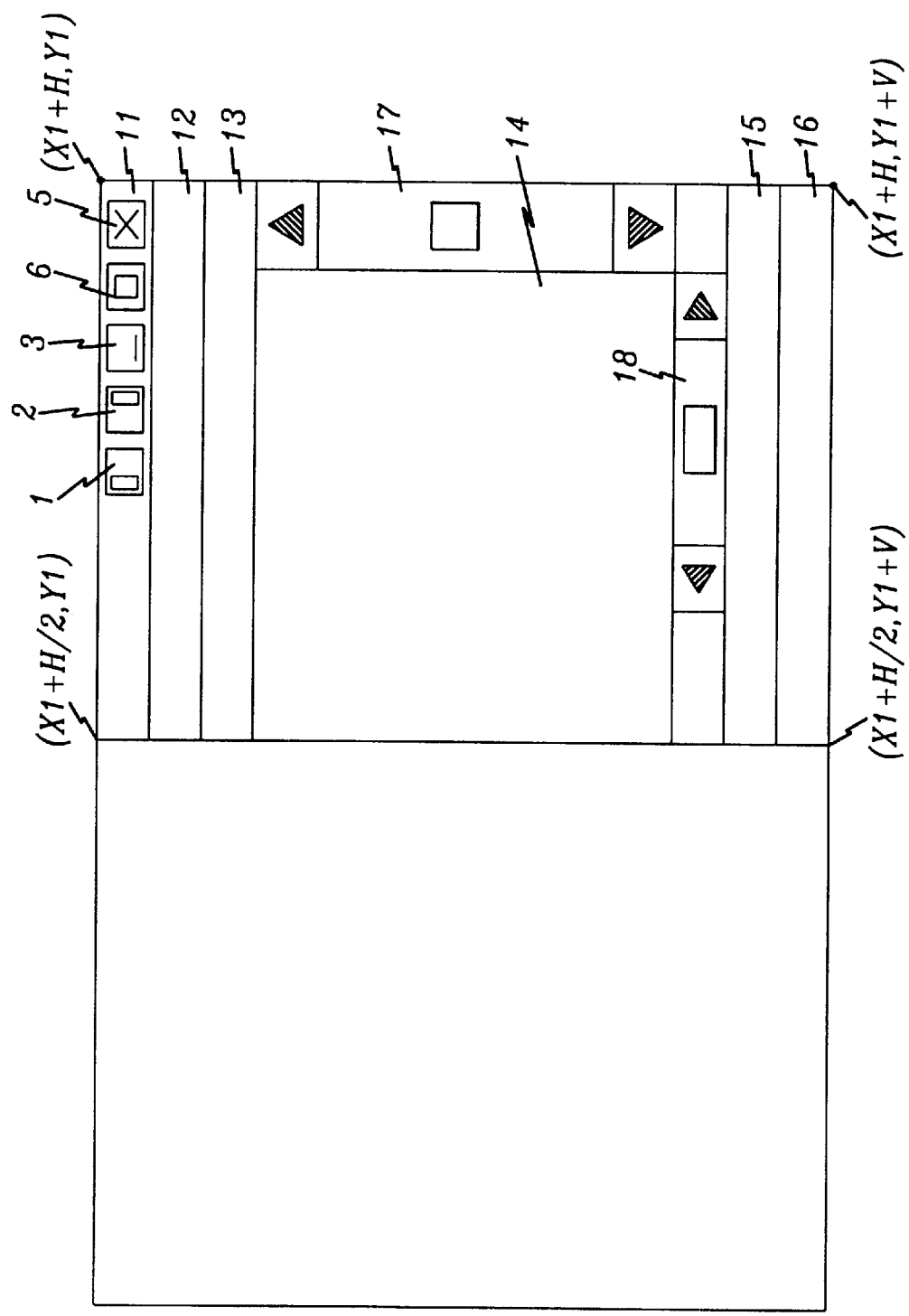
FIG. 5 is a view of a right screen split according to a display screen split method for a computer system according to the first preferred embodiment of the present invention.
Figure 6:
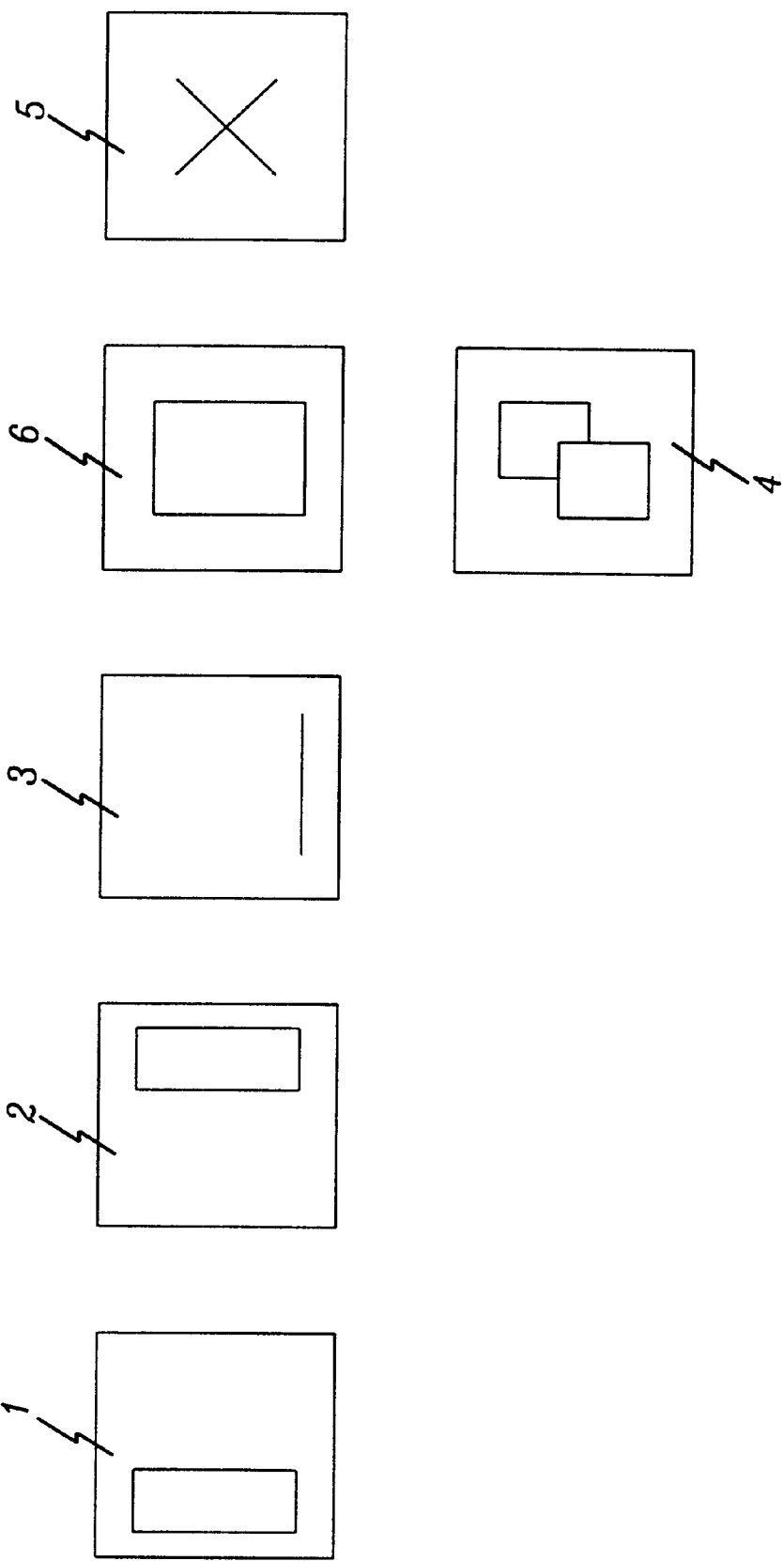
FIG. 6 is an enlarged view of a window icon.

FIG. 6 shows detailed shapes of various kinds of icons employed in FIGS. 3 thru 5 (previously discussed).

Figure 7:
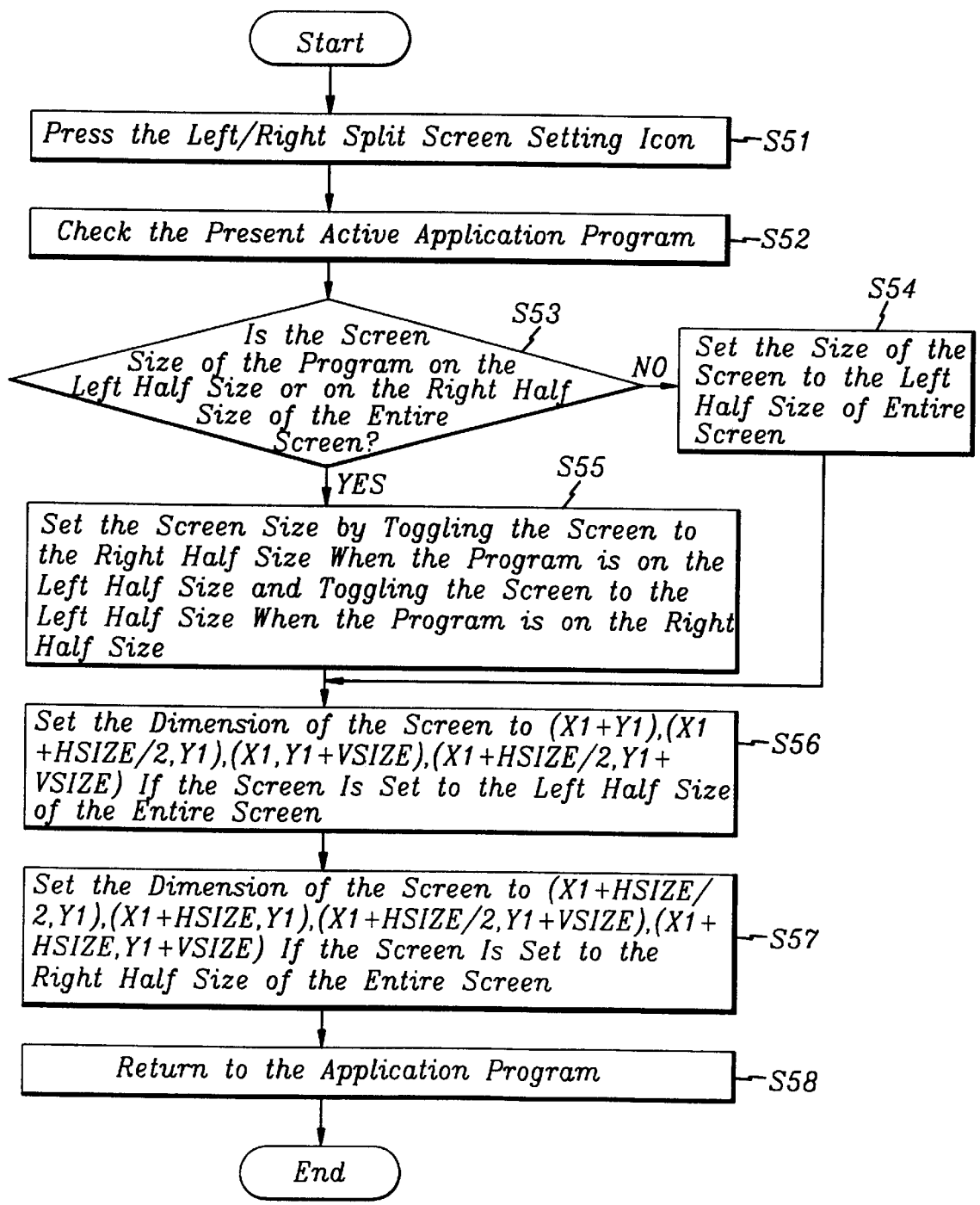
FIG. 7 is a flowchart of a display screen split method for a computer system according to a second preferred embodiment of the present invention.

As illustrated in FIG. 7, the display screen split method for a computer system according to the second preferred embodiment of the present invention comprises the steps of: sensing whether a left/right split screen setting icon 7 is pressed (Step 51); checking a present active application program when the left/right split screen setting icon 7 is pressed (Step 52); determining whether the screen size of the program is the left half size or the right half size of the entire screen (Step 53); setting the size of the screen by toggling the screen to the right half size when the program is on the left half size and toggling the screen to the left half size when the program is on the right half size (Step 55); setting the size of the screen to the left half size if the screen size of the program is not on the left half size or the right half size (Step 54); setting the dimension of the screen to (X1, Y1), (X1+HSIZE/2, Y1), (X1, Y1+VSIZE), (X1+HSIZE/2, Y1+VSIZE) if the screen is set to the left half size of the entire screen (Step 56); setting the dimension of the screen to (X1+HSIZE/2, Y1), (X1+HSIZE, Y1), (X1+HSIZE/2, Y1+VSIZE), (X1+HSIZE, Y1+VSIZE) if the screen is set to the right half size of the entire screen (Step 57); and returning to the application program (Step 58).

The operation of the display screen split method of a computer system according to a third preferred embodiment of the present invention is as follows, with reference to FIG. 8.

In the present invention, a left/right split screen setting icon 7 is added to the tray region 20 of the lower portion job indicating line 19 for window. The screen is set to the left half size or the right half size of the entire screen by only one operation when the user presses the icon 7, and the left half screen and the right half screen are switched by a toggle operation.

Figure 8:
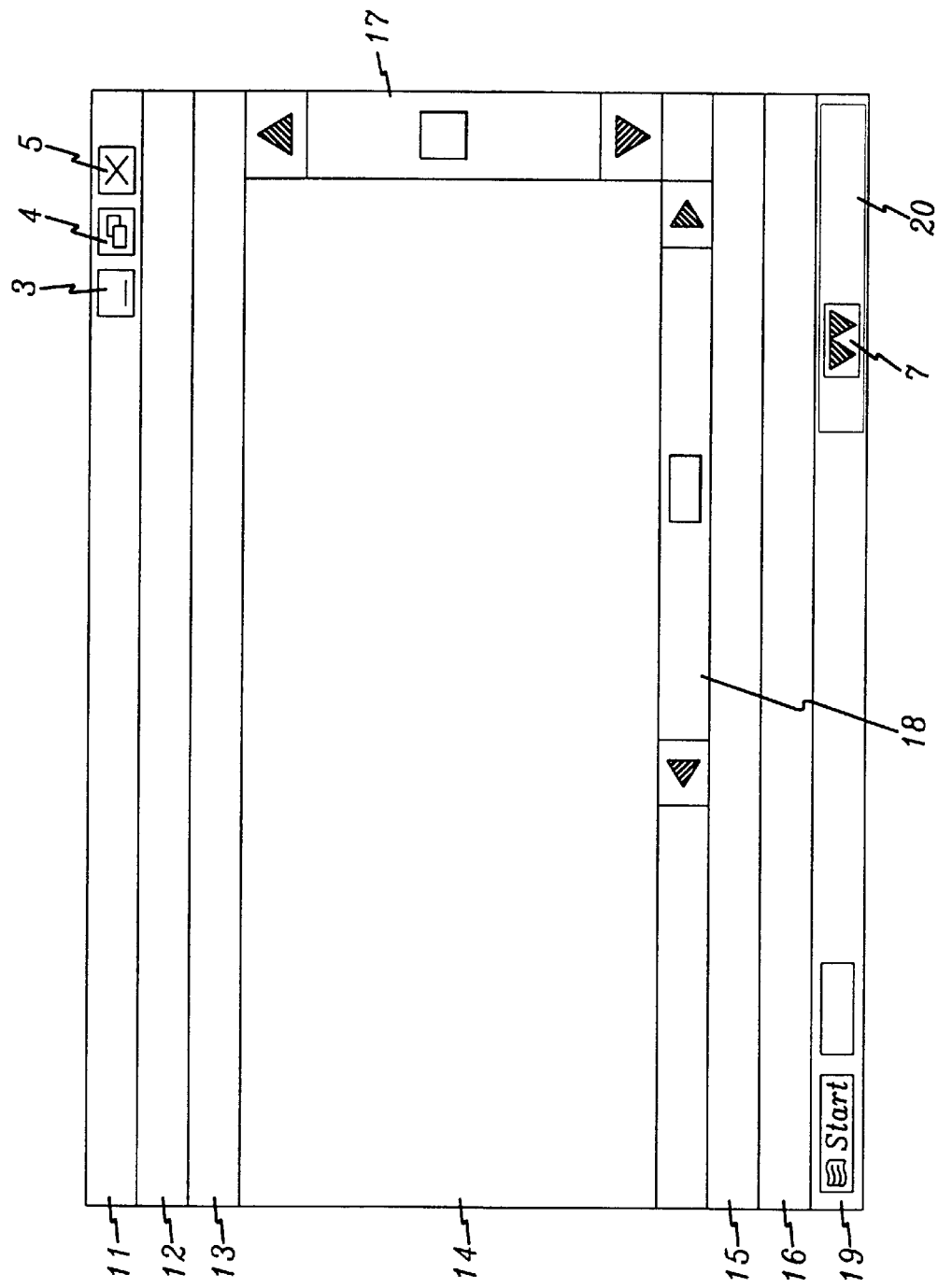
FIG. 8 is a view illustrating an entire screen state of a display screen split for a computer system according to the second preferred embodiment of the present invention.

FIG. 8 is a view before the screen is split. The CPU of the computer checks a present active program when the user presses a left/right split screen setting icon 7 (Step 51), and determines whether the screen size of the program is on the left half size or the right half size (Step 55).

The dimension of the screen is set to (X1, Y1), (X1+HSIZE/2, Y1), (X1, Y1+VSIZE), (X1+HSIZE/2, Y1+VSIZE) if the screen is set to the left half size of the entire screen (Step 56). The dimension of the screen is set to (X1+HSIZE/2, Y1), (X1+HSIZE, Y1), (X1+HSIZE/2, Y1+VSIZE), (X1+HSIZE, Y1+VSIZE) if the screen is set to the right half size of the entire screen (Step 57).

Figure 9:
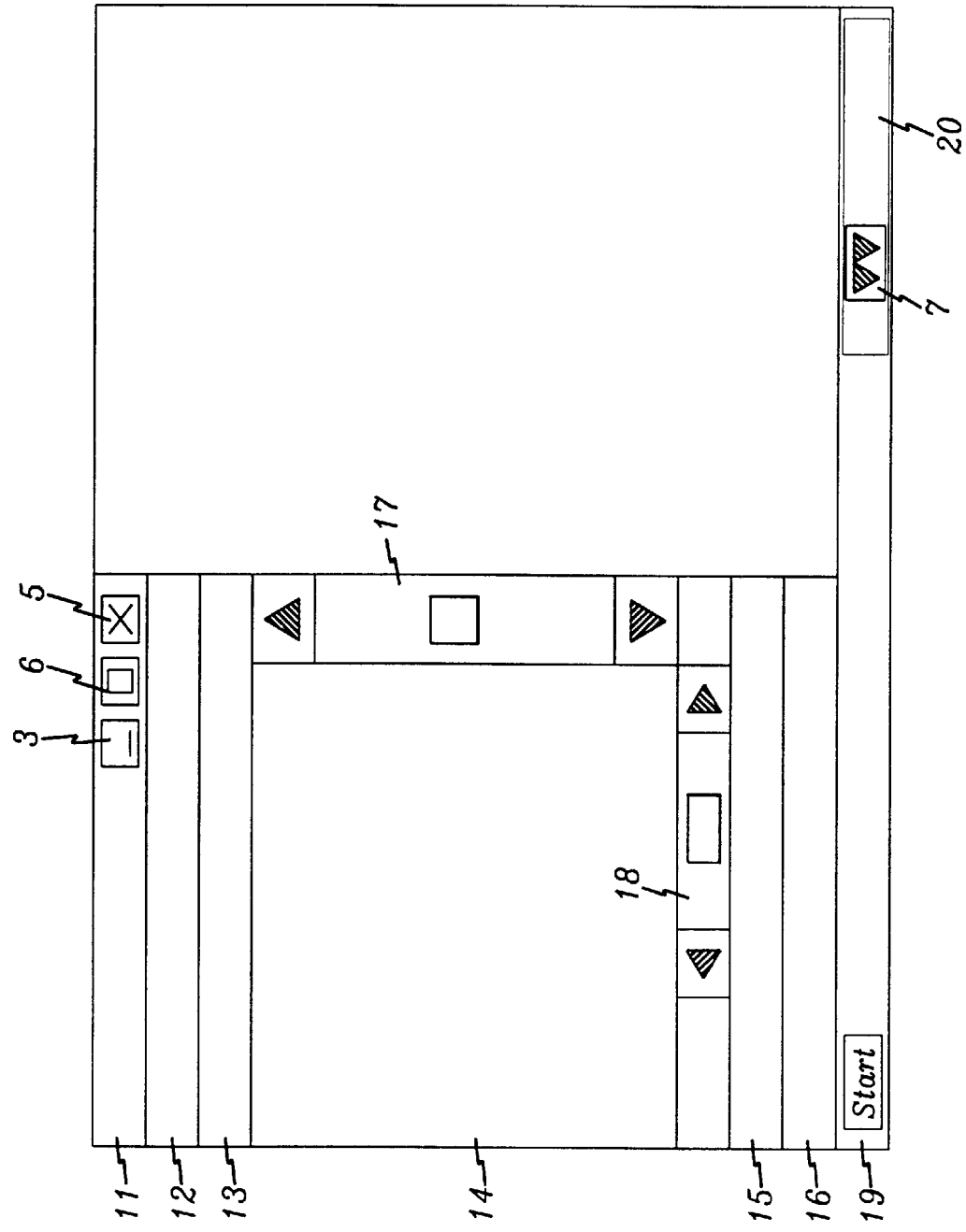
FIG. 9 is a view illustrating a state when a split icon is pressed from the state of FIG. 8.
Figure 10:
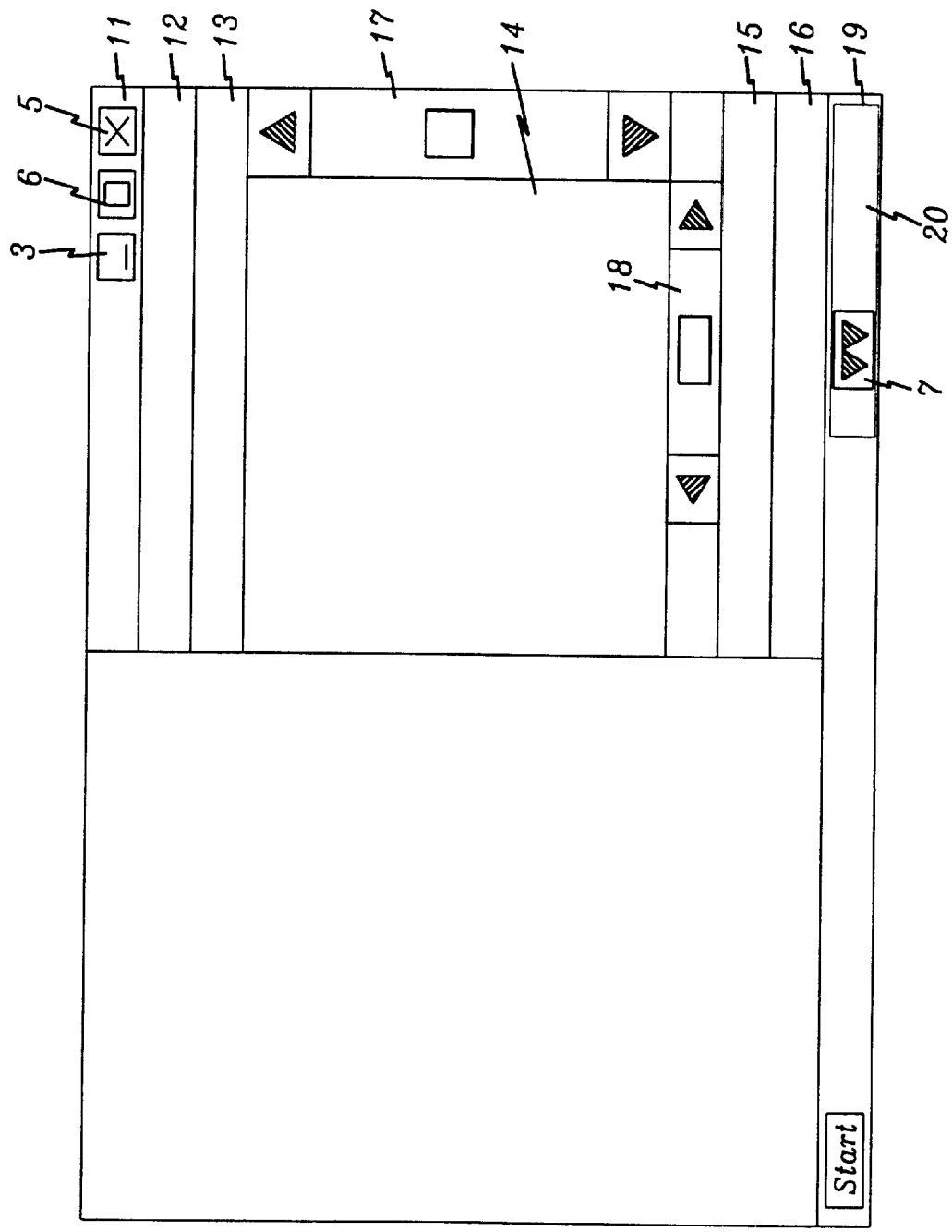
FIG. 10 is a view illustrating a state when the split icon is pressed from the state of FIG. 9.

FIG. 9 shows the left screen split state, and FIG. 10 shows a right screen split state.

After the splitting of the screen is finished, the screen returns to the application program, whereby the user can use the application program, and the routine is ended (Step 58).

The screen of the program is set to the left half size or the right half size of the entire screen only by pressing the left or right split icon a single time when the display screen split method for a computer system according to the present invention is used in a graphic device supporting a wide monitor and a wide function. Two programs can be performed on the left half size and the right half size of the entire screen of the computer monitor by using this function. That is to say, the user may watch a movie or TV on the left half screen of the entire screen using an MPEG program, and a word processor, table calculation or a data base program can be used on the right half screen of the entire screen.

As described above, the present invention provides a display screen split method for a computer system by which the user can vertically and exactly set the two programs on the monitor to the same screen size in a graphic device supporting a wide monitor and a wide function.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A display screen split method for a computer system, comprising the steps of:

determining whether a command for setting a split screen exists; and setting the size of the screen to one of a left half size and a right half size of an entire screen when the command for setting the split screen exists;

wherein the command for setting the split screen is generated when a split screen setting icon at predetermined coordinates of a display screen of the computer system is pressed; and wherein the method further comprises:

determining whether an active window is on one of a left half size and a right half size of an entire screen when the split screen setting icon is pressed;

setting the screen to the right split screen when the active window is on the left split screen, and setting the screen to the left split screen when the active window is on the right split screen;

setting one of the left split screen and the right split screen when the active window is not on the left split screen and is not on the right split screen; and generating the command for setting the split screen according to the state established by the setting steps.

2. The display screen split method for a computer system of claim 1, wherein the split screen setting icon is located in a caption bar.

3. The display screen split method for a computer system of claim 1, wherein the split screen setting icon is located in a job indication line.

4. The display screen split method for a computer system of claim 1, wherein the split screen setting icon includes a left split icon and a right split icon.

5. The display screen split method for a computer system of claim 1, wherein the split screen setting icon comprises a single icon.

6. A display screen split method for a computer system, comprising the steps of:

determining whether one of a left split screen setting icon and a right split screen setting icon has been pressed;

determining whether a screen size of a present active application program is on one of a left half size and a right half size of an entire display screen;

when the screen size of the present active application program is not on one of the left half size and the right half size of the entire display screen, setting a size of the display screen to the left half size of the entire display screen; and when the screen size of the present active application program is on one of the left half size and the right half size of the entire display screen, setting the size of the display screen by toggling the screen to the right half size when the program is on the left half size, and toggling the screen to the left half size when the program is on the right half size.

7. The display screen split method of claim 6, further comprising the step, after determining whether one of the left split screen setting icon and the right split screen setting icon has been pressed, of checking the present active application program.

8. The display screen split method of claim 7, further comprising the step of returning to the present active application program.

9. The display screen split method of claim 6, further comprising the steps of:

setting a dimension of the display screen to (X1+Y1), (X1+HSIZE/2, Y1),(X1, Y1+VSIZE), (X1+HSIZE/2, Y1+VSIZE, Y1+VSIZE) when the screen is set to the left half size of the entire display screen; and setting the dimension of the screen to (X1+HSIZE/2, Y1),(X1+HSIZE, Y1), (X1+HSIZE/2, Y1+VSIZE), (X1+HSIZE, Y1+VSIZE) when the screen is set to the right half size of the entire display screen.

10. The display screen split method of claim 9, further comprising the step of returning to the present active application program.

11. The display screen split method of claim 6, further comprising the step of returning to the present active application program.

12. A display screen split method for a computer system, comprising the steps of:

determining whether one of a left split screen setting icon and a right split screen setting icon has been pressed;

determining whether a screen size of a present active application program is on one of a left half size and a right half size of an entire display screen;

setting a left split screen by setting a dimension of the screen to (X1 ,Y1), (X1+HSIZE/2, Y1),(X1, Y1+VSIZE), (X1+HSIZE/2, Y1+VSIZE when the screen size of the present application program is on the right half size of the entire display screen; and setting a right split screen by setting the dimension of the screen to (X1+HSIZE/2, Y1), (X1+HSIZE, Y1), (X1+HSIZE/2, Y1+VSIZE),(X1+HSIZE, Y1+VSIZE) when the screen size of the present application program is on the left half size of the entire display screen.

13. The display screen split method of claim 12, further comprising the step of returning to the present active application program.

14. A display screen split method for a computer system, comprising steps of:

determining whether a left split screen icon has been pressed;

calculating an X dimension and a Y dimension of an entire display screen;

setting one of the left X coordinates and the right X coordinates to one-half of an entire screen width; and setting dimensions of the screen to (X1, Y1), (X1+HSIZE/2, Y1), (X1, Y1+VSIZE), (X1+HSIZE/2, Y1+VSIZE) when the right X coordinates are set to one-half of the entire screen width and setting dimensions of the screen to (X1+HSIZE/2, Y1), (X1+HSIZE, Y1), (X1+HSIZE/2, Y1+VSIZE), (X1+HSIZE, Y1+VSIZE) when the left X coordinates are set to one-half of the entire screen width.

* * * * *